United States Patent [19]

Bader

[11] Patent Number: 4,460,929
[45] Date of Patent: Jul. 17, 1984

[54] NOISE CANCELLING SYSTEM FOR LOW FREQUENCY ANALOG RECORDING

[75] Inventor: Clifford J. Bader, West Chester, Pa.

[73] Assignee: Burroughs Corporation, Detroit, Mich.

[21] Appl. No.: 472,071

[22] Filed: Mar. 4, 1983

[51] Int. Cl.³ .......................... G11B 5/04; G11B 5/43
[52] U.S. Cl. ........................................ 360/30; 360/27
[58] Field of Search .................... 360/20, 22, 30, 29, 360/27

[56] References Cited

U.S. PATENT DOCUMENTS 4,148,078  4/1979  Riddle, Jr. ............................ 360/27

Primary Examiner—Vincent P. Canney
Attorney, Agent, or Firm—Francis A. Varallo; Mervyn L. Young; Kevin R. Peterson

[57] ABSTRACT

The present disclosure describes an electronic system for use with low cost audio tape recorders whereby a substantially noise-free wide dynamic range is provided for the recording of analog signals in the DC to 30HZ frequency band. In achieving this result, the system utilizes two FM carrier oscillators having center frequencies displaced from each other and modulated respectively in opposite senses by the signal being recorded. The system also provides an additional utility channel of limited dynamic range for the concurrent recording of time markers, digital signals and the like.

10 Claims, 3 Drawing Figures

NOISE CANCELLING SYSTEM FOR LOW FREQUENCY ANALOG RECORDING

BACKGROUND OF THE INVENTION

Applications exist which require the recording of slowly varying electrical signals, in the passband frequencies of 0 (DC) to 30 HZ. Since the low frequency response limit of conventional tape recorders for audio use is on the order of 30 HZ, it is necessary to use some sort of modulation scheme during recording. The latter converts the input signals to corresponding signals lying within the usable recorder bandwidth. Such conversion is often accomplished using frequency modulation (FM). An oscillator is caused to vary in frequency in proportion to the input voltage signal to be recorded; the oscillator output is recorded; and subsequently the original signal is recovered by playback of the oscillator output through any one of a number of well known FM detector devices. One such detector employed advantageously in present day circuit design is the integrated circuit phase-locked loop.

As to noise considerations, the FM technique provides excellent rejection of amplitude noise arising from the magnetic tape itself and the recorder circuit components. However, it is quite sensitive to variations in the tape speed during signal recording. These variations occur for various reasons, for example, the changing mechanical load on the tape drive mechanism as the tape reel unwinds, or supply voltage variations. Another cause of tape speed variation in inexpensive battery operated tape recorders results from the sticking or hunting of the speed governor in mechanically governed type motors. Speed variations in small, battery operated recorders may approach five percent and the available FM dynamic range is only on the order of 20:1 (26 db.). This value can be increased by the use of signal compression techniques, at the expense of incremental resolution at higher signal levels and loss of fidelity in the compression-expansion process. Accordingly, the use of signal compression is not a desirable approach to the problem. Of course, high quality tape recorders are available for use where low noise and high stability are essential. The latter employ synchronous motors or elaborate feedback control systems. However, such equipment tends to be expensive and bulky.

What is desired is a relatively simple, efficient, economical system for use with low cost audio tape recorders which will provide a wide dynamic range recording means for analog signals lying in the frequency range of 0-30 HZ. The system of the present invention fills such a need.

SUMMARY OF THE INVENTION

In accordance with the present invention, two FM voltage-controlled oscillators are provided, having respective center frequencies displaced from each other and modulated in respective opposite senses by the signal to be recorded.

In an actual operative electronic circuit embodiment of the invention, the signal for which a wide dynamic range channel is desired is applied in its original and inverted forms respectively to the aforementioned FM oscillators. The outputs of both oscillators are combined and the resultant signal applied to the input terminal of the tape recorder.

Playback of the recorded information utilizes dual phase-locked loops. That is, the voltage controlled oscillators are reconfigured, in conjunction with phase comparators, low pass filters and input filters, to form two phase-locked loops. The low pass filters remove the oscillator carrier frequencies and close the loops to provide outputs proportional to the deviation of the input frequencies from the center quiescent value. Thus, the outputs of the low pass filters will reconstruct the respective recorded inputs. However, these output signals will also contain noise signals due to tape speed variations during record and playback. By subtracting the low pass filter outputs from each other, the original signal desired to be recorded is recovered and the noise signals are cancelled.

It is apparent from the foregoing, that the electronic circuit of the present invention achieves the desired noise-cancelling action by operation of the dual FM carrier oscillators wherein a given signal polarity achieves upward deviation of one carrier frequency and concurrent downward deviation of the other carrier frequency. Utilization of this technique has been found to typically reduce the noise level attributable to tape speed variations by a factor of 50. Accordingly, the dynamic range approaches 1000:1 or 60 DB, a 34 DB increase over the single-carrier system.

As a useful by-product of the circuit used in an actual operative embodiment of the invention, a utility channel, in addition to the noise free channel is provided. Signals associated with this limited bandwidth channel represent for example, time markers to be correlated with the signals on the noise free channel. The former are applied in the same sense to both oscillators in concurrence with the latter signals and are subsequently recovered in a manner similar to that described hereinbefore, except that they appear in the presence of considerable noise level.

Other features and advantages of the present invention will become apparent in the detailed description thereof which follows.

DESCRIPTION OF THE PREFERRED EMBODIMENT

Figure 1:
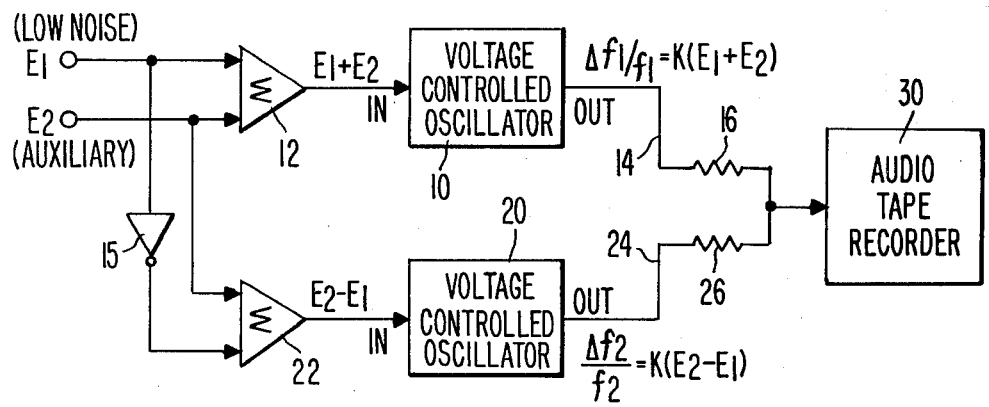
FIG. 1 is a block diagram illustrating an idealized "record" configuration of the system of the present invention.

The "record" configuration of the noise cancelling system of the present invention is depicted in FIG. 1. The low frequency signal $E_1$, to be recorded and for which a wide dynamic range channel is desired, is applied in its original form to a first voltage controlled oscillator (VCO) 10 and in inverted form as a result of inverter 15, to a second voltage controlled oscillator (VCO) 20.

Concurrently, the input signal $E_2$ for the auxiliary channel is applied in the same sense to both VCO 10 and VCO 20, through the corresponding summing amplifiers 12 and 22. These as well as inverter 15 are presumed to have unity voltage gain.

The two voltage controlled oscillators 10 and 20 are designed to have center frequencies sufficiently separated to permit subsequent demodulation of the individual carriers. Reference to FIG. 1 indicates that the fractional deviations of VCO 10 and VCO 20 are respectively $K(E_1+E_2)$ and $K(E_2-E_1)$. The factor K is a circuit-determined constant which is assumed to be equal for both oscillators.

The outputs of both voltage controlled oscillators 10 and 20 appearing respectively on lines 14 and 24 are applied via simple resistive addition means 16 and 26, or other suitable means, to the input terminal of an audio tape recorder 30. The amplitudes of the respective carriers are not critical but should not be so large that the recorder input stages are overloaded, nor so small that they approach the magnitude of noise level signals.

Figure 2:
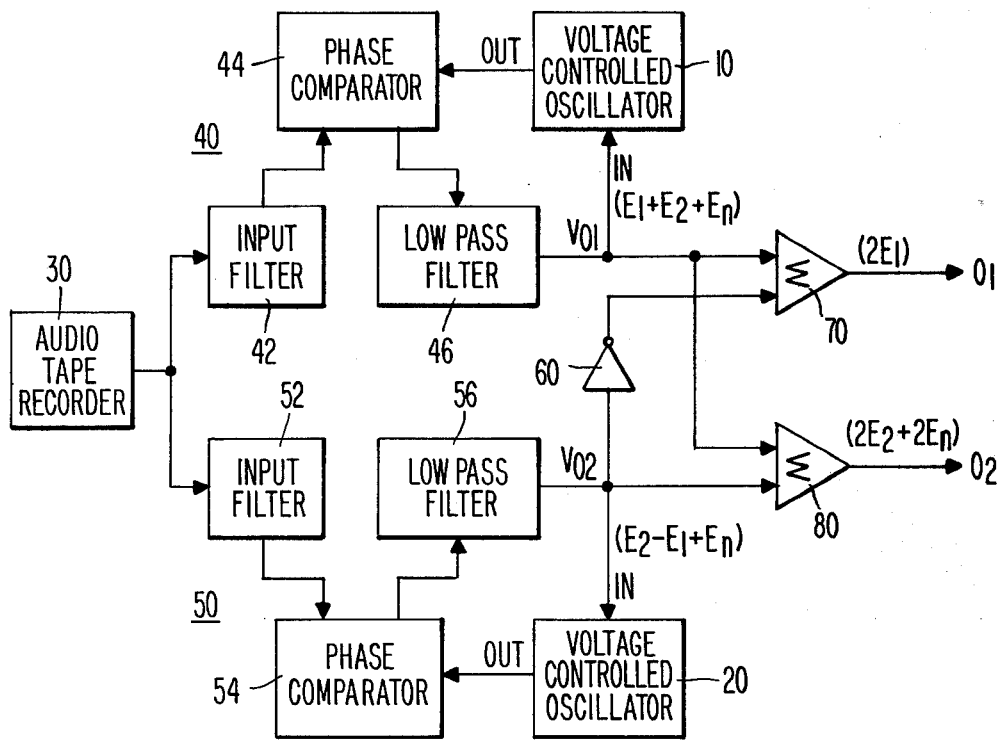
FIG. 2 is a block diagram illustrating the corresponding "playback" configuration.

FIG. 2 illustrates the "playback" configuration for recovering the signals $E_1$ and $E_2$ recorded as described in connection with FIG. 1. The output of the audio tape recorder 30 is applied in common to a pair of phase-locked loops 40 and 50. The first loop 40 includes an input filter 42, for passing the VCO 10 carrier frequency and rejecting that of VCO 20. The output of input filter 42 is applied to a phase comparator 44. The output of the latter is applied to a low pass filter 46 which removes the signal carrier associated with VCO 10 and provides an input to the latter. The output of VCO 10 is applied to phase comparator 44 thereby closing the loop. The components of the second phase-locked loop 50 are similar to those described for the first loop. They include an input filter 52, phase comparator 54, low pass filter 56, and VCO 20. The output signals provided by low pass filters 46 and 56 are respectively $(E_1+E_2)$ and $(E_2-E_1)$, thereby reconstructing the recorded input signals.

In addition to the last mentioned signals, the outputs of the low pass filters 46 and 56 will also contain a noise component, $E_n$, due to tape speed variations during "record" and "playback". These noise signals will in general be uncorrelated and will not cancel. Because the circuit coefficient "K" is made equal for both VCO's 10 and 20, the noise voltages $E_n$ appearing in the low pass filter outputs, $V_{O1}$ and $V_{O2}$ will be identical and in phase. Consequently, $V_{O1}=E_1+E_2+E_n$ and $V_{O2}=E_2-E_1+E_n$.

It remains to recover the original signals $E_1$ and $E_2$. To accomplish this, the low pass filter outputs $V_{O1}$ and $V_{O2}$ are subtracted to yield a signal representative of $E_1$. Thus $V_{O2}$ is inverted by inverter 60 and added to $V_{O1}$ in summation unit 70 to provide an output $O_1$. To recover $E_n$, the filter outputs $V_{O1}$ and $V_{O2}$ are added in summation unit 80 to form a second output $O_2$. Thus, $$O_1=(E_1+E_2+E_n)-(E_2-E_1+E_n)=2E_1$$

$$O_2=(E_1+E_2+E_n)+(E_2-E_1+E_n)=2E_2+2E_n$$

Output $O_1$ represents the noise-free channel, while output $O_2$ contains the noise component. Both channels exhibit a gain of 2 with respect to the amplitudes of the original signals.

Figure 3:
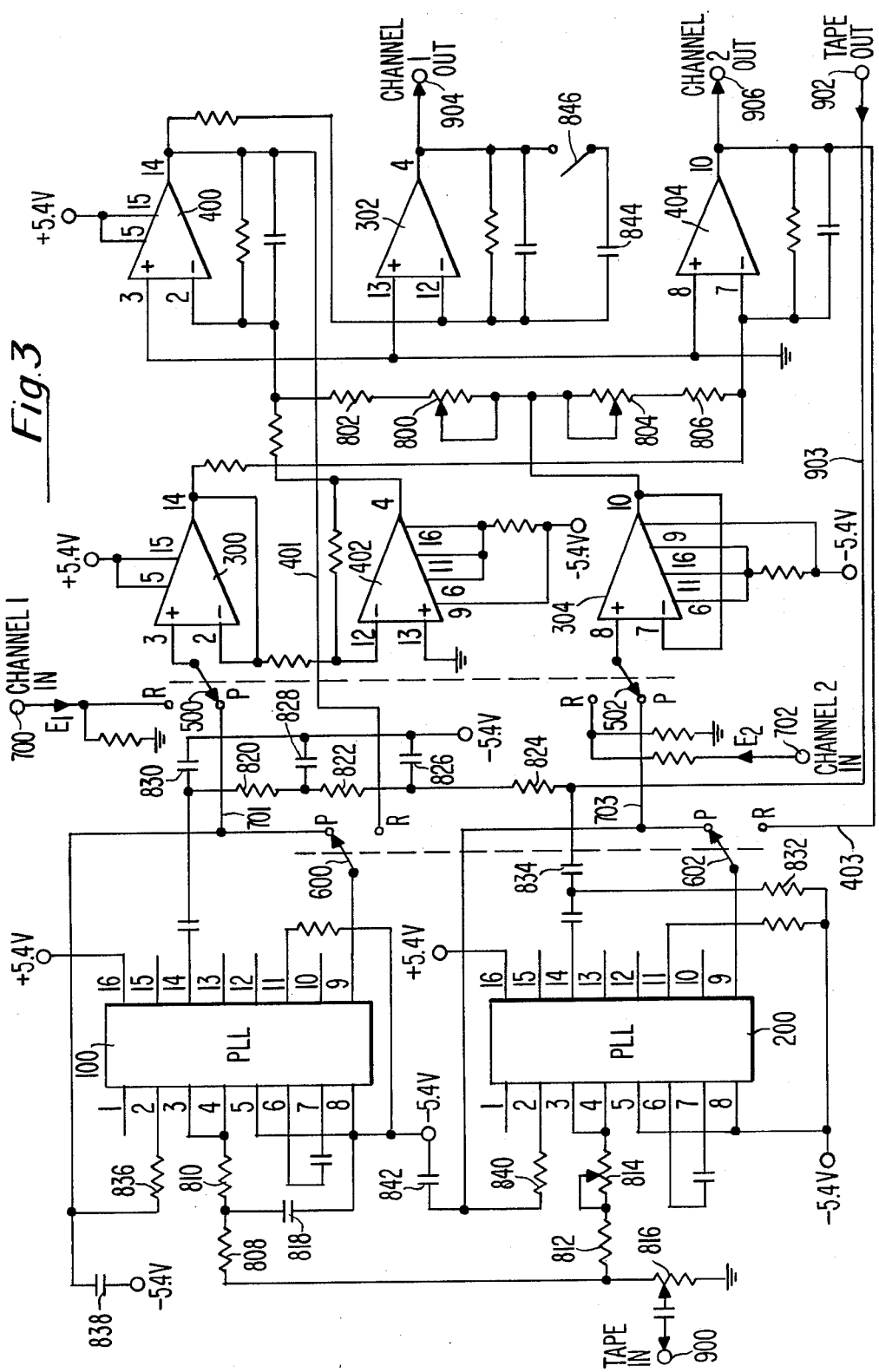
FIG. 3 is an electrical schematic of an actual operative system for performing the "record" and "playback" functions as indicated in FIGS. 1 and 2.

With reference to the schematic of FIG. 3, a practical operative embodiment of the present invention has been made using components and circuit configurations familiar to those versed in the art. A particularly suitable device for use in the system is the RCA CD4046, a COS/MOS phase-locked loop (PLL) implemented on a single monolithic integrated circuit chip. The characteristics and use of the CD4046 are described in detail in the RCA Solid State Division, Application Note ICAN-6101 entitled, "The RCA COS/MOS Phase-Locked-Loop a Versitile Building Block for Micro-Power Digital and Analog Applications" by David K. Morgan. Briefly, the PLL structure consists of a low power, linear, voltage controlled oscillator (VCO), and two different phase comparators having a common signal input amplifier and a common comparator input.

For a typical tape recorder, carrier frequencies are best chosen to be about 1 KHZ and 5 KHZ. This choice provides enough separation so that the two frequencies can be recovered with simple low pass and high pass RC filters. At the same time, the lower frequency is still high enough to permit the loop low pass filter to readily pass signal frequencies to approximately 30 HZ.

The summing, inverting and input/output buffering as required in the system described hereinbefore, may be performed by any standard operational amplifier. In practice, the Intersil type ICL 8023 amplifier provides excellent performance at lower power. The system of FIG. 3 operates with supply voltages of 5.4 volts and has a current drain of less than 1 milliampere.

With continued reference to FIG. 3, the configuration utilizes two CMOS phase-locked loop (PLL) integrated circuits (RCA type CD4046), namely 100 and 200, and two triple operational amplifier integrated circuits (Intersil type 8023) the individual sections of which are designated respectively 300, 302, 304 and 400, 402 and 404. "Record" and "playback" functions are provided by appropriate switching of both the amplifiers via switches 500, 502 and the phase-locked loops by way of switches 600 and 602. Channel 1, is the low noise channel and Channel 2, the auxiliary channel, as described hereinbefore in connection with FIGS. 1 and 2.

The PLL 100 operates at a center frequency of approximately 1 KHZ, and its companion PLL 200, at approximately 5 KHZ. The values of the timing components, resistor 102 and capacitor 104 for PLL 100 and resistor 202, capacitor 204 for PLL 200; and the feedback integrator networks, capacitor 106, resistor 108 for PLL 100 and capacitor 206, resistor 208 for PLL 200 are chosen in accordance with the operational guidelines in the RCA Application Note ICAN-6101, referenced hereinbefore.

In the "record" mode, switches 500, 502, 600 and 602 are all set to the "R", "record" position. Only the voltage-controlled oscillator (VCO) portions of the PLL's 100 and 200 are active at this time. The VCO control voltages which are derived from the supply potentials are varied in accordance with the input signals $E_1$ and $E_2$ applied respectively to the input terminals 700 and 702 of Channels 1 and 2.

The input to the VCO section of PLL 100 appears on its terminal 9. The latter terminal is driven in phase with signal $E_1$ on the Channel 1 input terminal 700 through the chain comprised of buffer 300, inverter 402 and inverter 400. The output signal of the last mentioned stage appears on line 401 and is applied via switch 600 to terminal 9 of PLL 100. Concurrently, the VCO of PLL 100 is driven from a signal $E_2$ on the Channel 2 input terminal 702 with 180° phase shift, through buffer 304, variable resistor 800, resistor 802 and inverter 400.

The VCO section of PLL 200 bearing an input on terminal 9 thereof, is driven out of phase with the Channel 1 input signal $E_1$ through buffer 300, and inverter 404. The output of the latter appears on line 403. Concurrently, the last mentioned VCO is driven from the Channel 2 input signals $E_2$ through buffer 304, variable resistor 804, resistor 806, and inverter 404. Gains are balanced via variable resistors 800 and 804.

It should be noted that as taught in connection with FIGS. 1 and 2, the foregoing method of driving the VCO's of PLL 100 and 200 satisfies the requirement that the two oscillators be frequency modulated in the opposite sense for the "quiet" channel, Channel 1, and in the same sense for the auxiliary channel, Channel 2. The outputs of the two VCO's appearing on the terminals 4 are combined in a resistive summing network comprised of resistors 808 and 810 associated with PLL 100 and resistor 812, variable resistor 814 associated with PLL 200 and resistive potentiometer 816. The capacitor 818 provides low pass filtering for the 1 KHZ oscillator in PLL 100 in order to reduce harmonic interference with the 5 KHZ oscillator. Potentiometer 816 sets the signal level applied to the microphone input terminal 900 of the tape recorder (not shown). As noted hereinbefore, the record level is not critical. Most entertainment type tape recorders have automatic level control (ALC) and will perform well with any signal which is well above the noise level.

For "playback", the switches 500, 502 and 600, 602 are moved to the "P", "playback" position. The Tape Output terminal 902 of the tape recorder, for example, the earphone jack, is applied via line 903 to the phase comparator input terminals 14 of PLL's 100 and 200 via appropriate filtering. More specifically, the low frequency PLL 100 is fed through a three section low pass filter comprised of resistors 820, 822 and 824, and capacitors 826, 828 and 830, which cuts off at 1.6 KHZ. The high frequency PLL 200 is fed through the high pass section, resistor 832, capacitor 834, which cuts off at 3.4 KHZ. The system is reasonably tolerant of input levels. At very low levels, lock will be lost and at very high levels, saturation and cross-modulation cause an increase in output noise and possible lock loss. However, any signal from a few hundred millivolts to a few volts is satisfactory.

The phase comparator outputs of the PLL's 100 and 200 appearing on terminals 2 are fed back to the VCO inputs on terminals 9 via the respective switches 600 and 602 and the low pass filters comprised respectively of resistor 836, capacitor 838, and resistor 840, capacitor 842. The action of loops 100 and 200 is such as to cause the respective VCO sections thereof to vary in a manner identical to the originally impressed inputs during the "record" cycle. The outputs of the VCO's thus carry components E1 and E2 of both channels in addition to the noise components En introduced by tape speed variations.

Signal separation and noise cancellation take place in the following manner. PLL 100 drives the Channel 1 output via line 701, through the operational amplifiers 300, 402, 400 and 302. Since this chain contains three inverters (the last three amplifiers mentioned), the Channel 1 output derived from PLL 100 is inverted with respect to the input. On the other hand, PLL 200 also drives the Channel 1 output via line 703, through amplifiers 304, 400 and 302. This chain contains two inverters (the last two mentioned) and the Channel 1 output on terminal 904 derived from PLL 200 is in phase with the signal output of the latter. The composite signal appearing on the Channel 1 output terminal 904 is therefore, the difference between the PLL 100 and PLL 200 signals. Both the noise components and the auxiliary channel signal are cancelled in the process. It should be noted that the original Channel 1 signal is doubled in amplitude, but amplifier 302 is set for a gain of 0.5 to restore the output to its recorded level.

For the auxiliary channel, Channel 2, PLL 100 drives the Channel 2 output via line 701, through amplifiers 300 and 404, the latter providing inversion. Similarly, PLL 200 drives the same channel output via line 703 and amplifiers 304 and 404, the latter amplifier also providing inversion. Since both chains contain inverters, the signal components appearing on the Channel 2 output terminal 906 are added. However, the Channel 1 signals are suppressed and the Channel 2 signals and the noise components related to tape speed variations are doubled. In this case a buffer gain of 0.5 is not provided, since the Channel 2 output signals are not intended for analog measurement purposes.

Amplifiers 400, 302 and 404 are provided with cutoff frequencies of 100 HZ in order to minimize feedthrough of carrier noise. Additional filtering for Channel 1 is provided by capacitor 844 and switch 846 which yield a cutoff of amplifier 302 at 10 HZ. This cutoff further reduces noise at some sacrifice of bandwidth.

It should be noted that the sequences of signal inversions in the operational amplifiers utilized in the operative embodiment of FIG. 3, differ in detail from the idealized descriptions accompanying FIGS. 1 and 2 in setting forth the inventive concept. In particular, the signals E2 applied to the auxiliary channel, Channel 2, undergo inversions in both the "record" and "playback" modes. The low noise channel, Channel 1, is recorded as shown in FIG. 1 but in the "playback" mode the output amplifier 302 in FIG. 3, produces an additional inversion. Thus, the Channel 1 output signal on terminal 904 is inverted with respect to the original signal applied to terminal 700. On the other hand, the Channel 2 inversions cancel and result in no phase change.

The operational amplifier configuration of FIG. 3, utilizing two triple section amplifiers as provided in the ICL 8023 integrated circuits, was used solely in the interest of hardware simplicity and economy, and it, like the use of the RCA CD4046 PPL's should be considered examples of how the invention may be implemented. However, they should not be construed as limitative of the invention. The cancellation and reinforcement principles applied to the signals present in the system as taught herein in a theoretical sense in connection with FIGS. 1 and 2, apply unequivocally to the practical embodiment represented by FIG. 3, since only relative phases are important in the additive and subtractive processes described hereinbefore.

Further, in most applications, the signal inversion caused by amplifier 302 is of no consequence. However, if an in-phase output is required, an additional unit gain inverter stage coupled to the output of amplifiers 302 will restore the original signal polarity. Similarly, the inherent amplitude doubling of the Channel 2 output signals may be avoided by addition of an amplifier with a gain of 0.5, as provided in the Channel 1 signal path. Manipulation of output signal amplitude levels and polarities include techniques well known to the electronic circuit designer.

In conclusion, there has been taught a relatively simple, low cost system for providing wide dynamic range recording of very low frequency analog signals using inexpensive audio tape recorders. It is apparent that depending upon the particular application, changes and modifications of the practical circuit embodiment of the invention presented herein may be required. Such changes and modifications insofar as they are not departures from the true spirit of the invention, are intended to be covered by the claims which follow.

What is claimed is:

1. A noise cancelling system for use in the recording and playback of low frequency, low level, analog signals comprising:

first and second sources of FM carriers having center frequencies separated from each other by a predetermined amount, means for applying said low level signals in their original and inverted senses respectively to said first and second sources to modulate the latter in respective opposite directions, means for summing the modulated carriers of said sources, the resultant summation signal being adapted to be applied to an input terminal of a magnetic tape recorder for recording thereby, means coupled to an output terminal of said tape recorder for separating during playback said modulated carriers, means for demodulating the latter in order to reconstruct said low level signals in their respective opposite senses, the latter signals appearing respectively with noise signal components generated by tape speed variations during the "record" and "playback" process, means coupled to receive the demodulated signals derived respectively from said first and second sources, and for subtracting the latter signals from the former thereby cancelling said noise signal components and providing output signals corresponding to said low level signals.

2. A noise cancelling system for use in the recording and playback of low frequency, low level, analog signals appearing at the input of a low noise channel and concurrent high level signals appearing at the input of an auxiliary channel comprising:

first and second sources of FM carriers having center frequencies separated from each other by a predetermined amount, means for applying said low level signals in their original and inverted senses respectively to said first and second sources, means for applying in concurrence with said low level signals, said high level signals in the same sense to both said first and second sources, said sources being modulated respectively in response to said low level and high level signals, means for summing the modulated carriers of said sources, the resultant summation signal being adapted to be applied to an input terminal of a magnetic tape for recording thereby, means coupled to an output terminal of said tape recorder for separating during playback said modulated carriers, means for demodulating the latter in order to reconstruct said low level and high level signals applied to each of said sources, the latter signals appearing respectively with noise signal components resulting from the tape speed variations during the "record" and "playback" process, means coupled to receive the demodulated signals derived respectively from said first and second sources and for subtracting the latter signals from the former, thereby cancelling both said noise signal components and said high level signals and providing output signals on said low noise channel corresponding solely to said low level signals, further means coupled to receive the demodulated signals derived respectively from said first and second sources for adding the latter signals to the former, thereby cancelling said low level signals and providing output signals on an output terminal of said auxiliary channel corresponding to both said high level and said noise signals.

3. A noise cancelling system as defined in claims 1 or 2 further characterized in that said first and second sources of FM carriers are respectively a pair of voltage controlled oscillators.

4. A noise cancelling system as defined in claims 3 wherein said means for demodulating said FM carriers during playback comprises a pair of phase-locked-loops.

5. A noise cancelling system as defined in claim 4 further characterized in that said means for separating said modulated carriers during playback are a pair of input filters, each adapted to pass the FM carrier of a given one of said voltage controlled oscillators and to reject that of the other of said oscillators, each of said input filters having an input terminal connected in common to said output terminal of said tape recorder, and an output terminal.

6. A noise cancelling system as defined in claim 5 further characterized in that each of said phase-locked-loops includes one of said pair of voltage controlled oscillators, a phase comparator, and a low pass filter each of which has at least one input terminal and an output terminal, the output terminal of one of said pair of input filters being coupled to an input terminal of said phase comparator, the output terminal of said phase comparator being coupled to the input terminal of said low pass filter, the output terminal of said low pass filter being coupled to the input terminal of said voltage controlled oscillator and the output terminal of the latter being coupled to a second input terminal of said phase comparator, thereby closing the loop.

7. A noise cancelling system as defined in claim 6 wherein said means for summing said modulated carriers of said voltage controlled oscillators in order that the combined carriers might be applied to said input terminal of said tape recorder comprises a resistive network.

8. A noise cancelling system as defined in claim 7 further characterized in that said means for applying signals to said pair of voltage controlled oscillators comprises a plurality of operational amplifiers.

9. A noise cancelling system as defined in claim 8 wherein said means coupled to receive the demodulated signals derived during playback from said pair of voltage controlled oscillators comprise a plurality of operational amplifiers.

10. A noise cancelling system as defined in claim 9 further characterized in that said center frequencies of said pair of voltage controlled oscillators are respectively 1 KHZ and 5 KHZ.

* * * * *